Oct. 13, 1953

V. H. ANDERSON 2,654,906

DRILL PIPE WIPER

Filed April 27, 1950

INVENTOR.
VERNON H. ANDERSON
BY
Attorney

UNITED STATES PATENT OFFICE 2,654,906

DRILL PIPE WIPER

Vernon H. Anderson, Hermosa Beach, Calif.

Application April 27, 1950, Serial No. 158,499

4 Claims. (Cl. 15—210)

This invention relates to drill pipe wipers which are particularly adapted for cleaning mud from oil well drill pipe when and as it is pulled from the drill hole. The mud is that specially prepared material used in drilling operations and ordinarily adheres to the pipe in considerable quantities.

Several types of wipers have been and are now in use. The apertured diaphragm type is subjected to such stretching when joints, protectors, drill collars and the like are passed, that the wiper is quickly destroyed. Usually, the wiper which must be made to closely fit the pipe proper, is so stretched by the joints, etc., that its elastic limit is exceeded and its destruction is rapid.

Another type is in the form of a split and centrally apertured disk. This has a longer life than the one-piece diaphragm, but when it passes an enlarged joint or collar, its sections separate and it leaves quantities of mud on the pipe at the points of separation.

Objects of the present invention are to provide a drill pipe wiper which is not subjected to elastic stresses which are damaging to the material thereof when it encounters enlargements on the drill pipe.

Another object is to provide a wiper which includes separate wiper tongues arranged in such a manner that they will remain in an overlapped relationship when an enlargement is met and therefore, the entire pipe is wiped relatively completely. A further object is to provide such an overlapping arrangement in which a lower set of tongues provides spaces for the passage therethrough of material dislodged by an upper set of tongues.

The above and other objects and advantages will become apparent from the following description in connection with the drawing, wherein.

Figure 1:
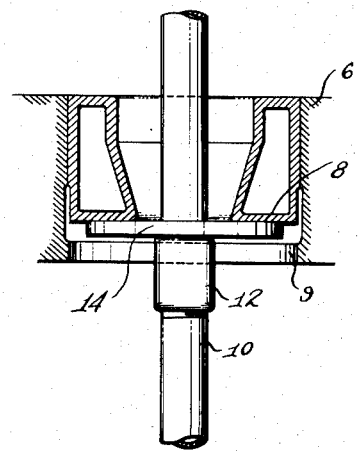
Fig. 1 is a side elevational view of an installation of the device below a master bushing in a well table, the bushing and a portion of the table being in section.

In Fig. 1 there is shown part of a well table 6 having an opening 9 therethrough. A conventional bushing 8 is located in the opening in the usual manner.

A drill pipe 10 extends through the bushing 8. The pipe is of considerable less size than the open center of the bushing so it can pass freely therethrough. The bushing also is of a size amply sufficient to pass enlargements such as a pipe coupling 12.

Shown just below the bushing 8 is a wiper 14 which includes a flat ring 16 having an upper set of three wiper tongues 18 and a lower set of wiper tongues 20. All of the tongues 18 and 20 are preferably formed integrally with the ring 16. The material is preferably rubber reinforced with a heavy woven fabric. This combination provides flexibility and strength as well as resistance to moisture.

Figures 3, 5:
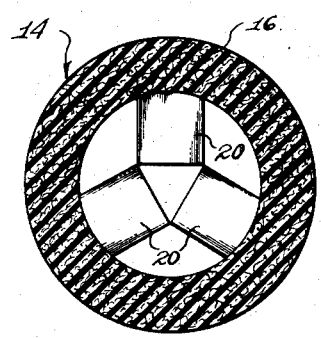
Fig. 3 is a vertical sectional view through the device.
Fig. 5 is a sectional view taken approximately on the line 5—5 of Fig. 3.

The annular portion of the reinforced rubber ring 16 is preferably made in one piece as shown in Fig. 3. The upper and lower portions thereof each carry a set of wiper tongues. The tongues 18 are on the upper half or portion of the ring; and the tongues 20 are on the lower portion.

Figure 2:
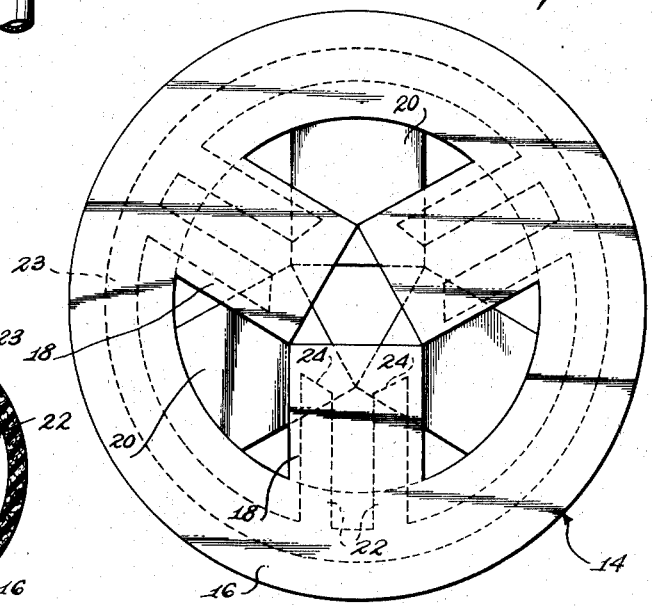
Fig. 2 is an enlarged plan view of an embodiment of the invention.
Figure 4:
Fig. 4 is a section taken approximately on the line 4—4 of Fig. 3.

In Figs. 2, 3 and 4 the upper tongues 18 are shown with leaf springs 22 embedded therein and disposed substantially radially of the ring 16. The outer ends of the springs are secured to and, as shown, are preferably integral with a circular anchor ring 23 located in the ring 16 and their inner ends terminate short of the inner ends of the tongues. It should be noted that the spring ends 24 are oppositely angled in each tongue 18. This end shape together with the fact that there are two leaf springs, one on each side of the longitudinal center line of the tongue permits the inner ends of tongues 18 to better assume the curved circumference of the drill pipe when the latter is drawn through the wiper.

Referring to Fig. 3, it is seen that the lower set of wiper fingers 20 is located so each finger 20 lies between an adjacent pair of upper fingers 18 and that the inner end corners of the two sets of tongues 18 and 20 are lapped one over the other. This, of course, is the rest position. When a section of pipe is drawn upwardly through the wiper, the pipe will occupy the center of the wiper and the inner portions of the tongues will be flexed in an upward curve. The inner end edges of the wiper tongues 18 and 20 will wipe the pipe clean.

Not only the upper tongues 18, but the lower tongues 20 will bend or arch transversely at their inner ends to produce contours which curve around the pipe.

When the sets of tongues curve upwardly, the overlap of the inner corners will be lessened somewhat but it is intended that the proportions of the tongues be such that they will remain overlapped even when they expand to pass pipe joints, protectors, drill collars and the like.

A feature of the embodiment of the invention shown in the drawings is that the tongues of the lower set are spaced apart at their roots to provide liberal spaces through which material dislodged by the upper tongues may fall, the upper tongues being in positions extending across these spaces.

The leaf springs 22 provide resilient reinforcement for the wiper tongues and increase the wiping pressure against the pipe. They are shown only in the upper wiper tongues 18. However, the tongues 18 overlie the tongues 20 and the effect of the springs is exerted on the tongues 20.

The present drill pipe wiper is not subjected to the elastic stresses of an apertured diaphragm and it provides for expansion without loss of wiping continuity as in the case of split disk type of wiper. Consequently, it combines the advantages of wiping efficiency and long life.

It should be understood that the illustrated structure may be modified without departing from the spirit of the invention.

I claim:

1. In a drill pipe wiper, a body having an open inner area, a set of wiper tongues of flexible material secured to said body and extending into said open area and a pair of laterally spaced resilient stiffeners carried by and extending longitudinally of at least some of said tongues on opposite sides of the center lines of the tongues.

2. In a drill pipe wiper, ring means, a lower set of tongues extending inward from said ring means, an upper set of tongues extending inward from said ring means, said upper tongues being positioned over the spaces that separate the lower tongues, and a pair of longitudinal leaf springs incorporated in each of said upper tongues on the opposite sides of the center lines of the tongues.

3. In a drill pipe wiper, a combination as set forth in claim 2, in which the ends of the leaf springs in each pair are oppositely angled with the inner sides of each pair of leaf springs shorter than the outer sides.

4. In a drill pipe wiper, a combination as set forth in claim 3 in which said leaf springs extend inward from a metal ring incorporated in said ring means.

VERNON H. ANDERSON.

References Cited in the file of this patent

UNITED STATES PATENTS

| Number | Name | Date |
|--------|------|------|
| 202,988 | Cate | Apr. 30, 1878 |
| 423,338 | Newell | Mar. 11, 1890 |
| 1,868,794 | Fuller et al., | July 26, 1932 |
| 2,198,698 | Fitzmeyer | Apr. 30, 1940 |
| 2,444,653 | Kennedy et al. | July 6, 1948 |

FOREIGN PATENTS

| Number | Country | Date |
|--------|---------|------|
| 396,061 | Great Britain | July 26, 1933 |